United States Patent [19]

Miki et al.

[11] Patent Number: 5,508,050
[45] Date of Patent: Apr. 16, 1996

[54] METHOD FOR PREPARING SPRING ROLL

[75] Inventors: Takashi Miki; Kiyoko Arai, both of Tokyo; Yuichi Sugiyama, Koshigaya, all of Japan

[73] Assignee: Nichirei Corporation, Tokyo, Japan

[21] Appl. No.: 377,031

[22] Filed: Jan. 23, 1995

[30] Foreign Application Priority Data

Jan. 28, 1994 [JP] Japan ................................. 6-008458

[51] Int. Cl.$^6$ ............................. A23P 1/08; A21D 13/00; A21D 6/00
[52] U.S. Cl. ................................................... 426/297
[58] Field of Search ............................................. 426/297

[56] References Cited

U.S. PATENT DOCUMENTS

| | | | |
|---|---|---|---|
| 4,009,288 | 2/1977 | Fukagawa | 426/297 |
| 4,073,953 | 2/1978 | Trostmann et al. | 426/297 |
| 5,196,215 | 3/1993 | Yokoyama et al. | 426/94 |
| 5,286,504 | 2/1994 | Sheen et al. | 426/243 |

Primary Examiner—Donald E. Czaja
Assistant Examiner—Choon P. Koh
Attorney, Agent, or Firm—Darby & Darby

[57] ABSTRACT

A method for preparing a spring roll involves putting an ingredient material on a dough sheet of the spring roll, rolling up the dough sheet to wrap the ingredient material, and frying the rolled spring roll. A food material containing a main component selected from polysaccharides, powders of grains and mixtures thereof is attached to 40% or more surface area of the dough sheet based on a total surface area of the dough sheet of the spring roll before the spring roll is fried.

34 Claims, 1 Drawing Sheet

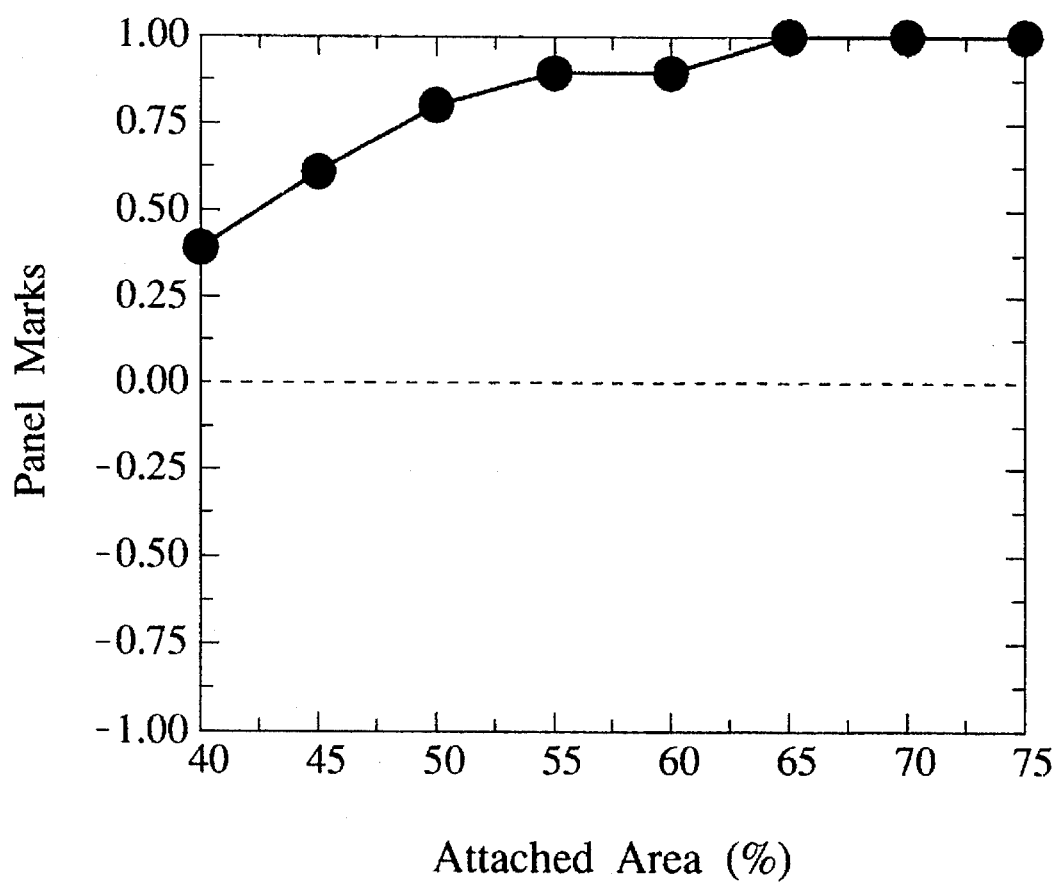
FIG.

METHOD FOR PREPARING SPRING ROLL

BACKGROUND OF THE INVENTION

This invention relates to a method for producing a spring roll. The spring roll is a product related to dim sum, a Chinese food. Its Japanese equivalent is termed "harumaki" which is enjoyed by many people. The spring roll is produced by cutting meat of animals, fish or shellfish and plants such as vegetables in strips and frying the strips with oil to obtain an ingredient material, rolling the ingredient material in a dough sheet of wheat flour or the like in an elongated roll and frying the roll with cooking oil maintained at a lower cooking temperature.

In general, it is desired of the spring roll to have both the crispy mouth feel touch proper to its dough sheet and the soft mouth feel touch of the ingredient material wrapped by the dough sheet. Such combined mouth feel touch is present usually in the spring roll immediately after frying.

However, if the spring roll is sold in larger quantities in, for example, a supermarket, it cannot always be offered in the fresh fried state. Besides, such fresh fried spring roll is not necessarily eaten by the consumers soon after it is bought. It often takes from four to six hours from the time the spring roll is fried until it is eaten by the consumers. If several hours have elapsed since frying, the moisture contained in the ingredient material is absorbed by the fresh fried crispy dough sheet. In addition, if the spring roll is wrapped for sale in the supermarket or the like, such moisture absorption by the dough sheet of the spring roll tends to be promoted, such that the crispy mouth feel touch proper to the dough sheet of the spring roll is lowered.

SUMMARY OF THE INVENTION

It is therefore an object of the present invention to provide a method for producing a spring roll with which the mouth feel touch of the dough sheet of the spring roll is lowered to a lesser extent after lapse of several hours after frying and the crispy mouth feel touch proper to the dough sheet of the spring roll immediately after frying may be maintained for a longer time.

These and other objects of the present invention will become apparent from the following description.

According to the present invention, there is provided a method for preparing a spring roll comprising putting an ingredient material on a dough sheet of the spring roll, rolling up the dough sheet to wrap the ingredient material, and frying the rolled spring roll. In accordance with the invention, a food material consisting essentially of a main component selected from the group consisting of polysaccharides, powders of grains and mixtures thereof, is applied, i.e., coated, to 40% or more of the surface area of the dough sheet, based on a total surface area of the dough sheet of the spring roll, before the spring roll is fried.

BRIEF DESCRIPTION OF THE DRAWING

The sole figure is a graph showing the results of a panel test for mouth feel touch for Example 10.

PREFERRED EMBODIMENTS OF THE INVENTION

With the method of the present invention, in which the ingredient material is put on the dough sheet of the spring roll, the dough sheet is then rolled up to wrap the ingredient material and the resulting elongated roll is fried, a specified food material is applied, preferably by combining or spraying, to not less than 40%, preferably not less than 60% and more preferably not less than 75% of the surface area of the dough sheet based upon its total surface area. By "not less than 40% of the surface area of the dough sheet based upon its total surface area" is meant the percentage related to the area of the front and back surfaces of the dough sheet.

If, during the operation of rolling up the ingredient material with the dough sheet of the spring sheet, the specified food material becomes elongated or permeated into the dough sheet of the spring roll such that the specified food material becomes prior frying effectively affixed to not less than 40% of the surface area of the spring roll, the specified food material is deemed to have been attached to not less than 40% of the total surface area of the dough sheet. If the specified food material is attached to less than 40% of the total surface area, the crispy mouth feel tough proper to the fresh fried dough sheet of the spring roll tends to be markedly lowered.

If liquid oil is contained in the specified food material, and if the specified food material is attached to more than 90% of the surface area, poor working efficiency is encountered in rolling up the dough sheet of the spring roll. It is therefore preferred that the above-mentioned attached area of the specified food material be in a range of 40 to 90%, preferably in a range of 60 to 90% and more preferably in a range of from 75 to 90%.

As the dough sheet of the spring roll, it is possible to use a usual baked dough sheet of the spring roll including wheat powders. A heated and dried dough sheet of the spring roll is heated on a drum by steam including starch, such as tapioca starch. As the ingredient material put on the dough sheet and rolled, it is possible to use the usual ingredient materials for the spring roll, such as cooked and seasoned meats, vegetables, fish or shellfish.

In the method of the present invention, the food material attached in an amount of 40% or more surface area based on the total surface area of the dough sheet of the spring roll contains polysaccharides and/or powders of grains as essential components. Examples of the polysaccharides include edible starch, such as potato starch, sweet potato starch, corn starch, wheat starch, or tapioca starch; modified starch prepared from starch, such as pregelatinized starch, acetic modified starch, or phosphoric modified starch; and processed starch, such as heat-moisture treated starch. Examples of powders of grains include wheat powders, rice powders, semolina powders, corn grits, foxtail millet and Deccan grass. These may be used singly or as a mixture. The powders of grains may have a particle size preferably of 10 to 1000μ and more preferably of 100 to 300μ. If the particle size of the powders of grains is less than 10μ, the working efficiency is lowered, whereas if it exceeds 1000μ, a problem is raised in connection with the mouth feel touch.

If necessary, oil and fats may be contained in the food material containing the polysaccharides and/or the powders of grains. The oil and fats may be in liquid form or solid form, although the liquid form is preferred. Examples of the oil and fats include vegetable oil and fats, such as safflower oil, sun flower oil, cottonseed oil, rapeseed oil, soybean oil, rice oil, sesame oil, corn oil, kapok oil, peanut oil, olive oil, coconut oil, palm oil, cacao butter or shea butter; and animal oil and fats, such as whale oil, sardine oil, Menhaden oil, herring oil, shark liver oil, cod liver oil, pollack liver oil, beef tallow, lard or butter fat. These may be used singly or in combination. The vegetable and animal oil and fats may also be used together.

The oil and fats act as media for suspending the essential components of the food material, i.e. polysaccharides and/or powders of grains therein, while providing for facilitated attachment of the food material and improved stability in the quality of the produced spring roll. The oil and fats are contained in an amount of 50 to 95 wt % and preferably 70 to 90 wt % based on the total weight of the food material. If the oil and fats are contained in an amount less than 50 wt %, the desirable effect may not be achieved, whereas if the oil and fats are contained in an amount exceeding 95 wt %, the crispy mouth feel touch proper to the dough sheet of the spring roll after lapse of several hours after frying may undesirably be lowered.

If oil and fats are used, it is preferred to use an emulsifier in combination in the food material. Examples of the emulsifier include alginic acid propylene glycol ester, glycerin fatty acid ester, saccharose fatty acid ester, sorbitan fatty acid ester and propylene glycol fatty acid ester. The emulsifier may preferably be contained in an amount of 0.1 to 10 parts by weight and more preferably 0.5 to 3.0 parts by weight to 100 parts by weight of the oil and fats.

In the food material containing polysaccharides and/or powders of grains, additives, such as a viscosity increasing agent, may be contained, if so required. Examples of such agent include sodium alginate, carboxyl methyl cellulose calcium, carboxyl methyl cellulose sodium, starch sodium glycolate, starch sodium phosphate, sodium polyacrylate and methyl cellulose. The viscosity increasing agent is contained preferably in an amount of not more than 10 wt % based on the total weight of the food material containing the polysaccharides and/or powders of grains.

In the method of the present invention, the food material including the polysaccharides and/or powders of grains may be applied to the dough sheet of the spring roll by spraying, brushing or with the aid of a roll or a sieve to provide a coating of the food material over a desired surface area and location of the dough sheet. For industrial preparation, it is preferred to attach the food material at a desired portion of the dough sheet of the spring roll by a spray, roll, brush or sieve mounted at a desired process position of a currently employed device for preparing the spring roll.

There is no limitation to the time point at which the food material is contacted with and attached to the dough sheet provided that such time point precedes frying. Thus the food material may be contacted with and attached to the dough sheet before putting the ingredient material on the dough sheet, when rolling up the dough sheet after putting the ingredient material on the dough sheet, or after rolling up the dough sheet. These time points may be suitably combined together so that the food material may be attached in two or more fractional parts. For improving productivity and preventing attachment of the food material onto the spring roll producing device, it is preferred to attach the food material on a fractional portion or an entire portion of the surface of the dough sheet on which the ingredient material is place and subsequently on the remaining portion of the dough sheet during and/or after rolling up the dough sheet.

The food material including the polysaccharides and/or powders of grains is preferably attached, such as by sifting, on the dough sheet of the spring roll in an amount of preferably 1.0 to 10.0 g/100 cm$^2$ and more preferably in an amount of 3.0 to 5.0 g/100 cm$^2$ of the surface area of the dough sheet of the spring roll, if the food material is in the solid form, such as in the form of powders. If the amount is less than 1.0 g/ 100 cm$^2$ the crispy mouth feel touch proper to the dough sheet of the spring roll after lapse of several hours after frying may undesirably be lowered, whereas if the amount exceeds 10.0 g/100 cm$^2$, the dough sheet may become undesirably hardened. On the other hand, if the food material is in liquid form, such as in the form of a liquid suspension containing the oil and fats or the like, it is preferably attached, such as by coating, on the dough sheet of the spring roll in an amount of preferably 1.0 to 5.0 g/100 cm$^2$ and more preferably in an amount of 2.2 to 3.0 g/100 cm$^2$ of the surface area of the dough sheet of the spring roll. If the amount is less than 1.0 g/100 cm$^2$, the crispy mouth feel touch proper to the dough sheet of the spring roll after lapse of several hours after frying may undesirably be lowered, whereas if the amount exceeds 5.0 g/100 cm$^2$ the dough sheet may become too soft or flaccid by the oil and fats or the like, such that a poor working efficiency in rolling up the dough sheet of the spring roll results.

In the method of the present invention, there is no limitation to the method of rolling up the dough sheet of the spring roll provided that the ingredient material is covered in its entirety by the dough sheet.

In the method of the present invention, a spring roll product obtained by attaching the food material including the polysaccharides and/or the powders of grains and rolling up the dough sheet of the spring roll, can be fried using cooking oil of, for example, 170° to 200° C.

In the method of the present invention, the spring roll product obtained after attachment of the food material including the polysaccharides and/or powders of grains and rolling up of the dough sheet of the spring roll, can be stored in a refrigerator or frozen before frying. The freezing may preferably be carried out at –15° C. to –25° C.

In the method of preparing the spring roll according to the present invention, since the food material containing the polysaccharides and/or the powders of grains is attached on a specified area portion of the dough sheet of the spring roll before frying, it becomes possible to prevent the crispy mouth feel touch proper to the fresh fried dough sheet from being lowered, so that the preset method is highly useful in the preparation of the spring roll which is offered for sale in a supermarket and which is eaten after a lapse of several hours since frying.

EXAMPLES OF THE INVENTION

The present invention will now be explained with reference to Examples and Comparative Examples. It is noted that these Examples are given only for illustration and are not intended for limiting the invention.

EXAMPLES 1 TO 7 AND COMPARATIVE EXAMPLES 1 TO 4

On each one side of entire surface of a plurality of different commercially available wheat-containing baked dough sheets of spring rolls 16 cm by 16 cm in size, were coated 7 g of the food materials having the compositions shown in Table 1 in an amount of 2.5 g/ 100 cm$^2$ for each roll. A pre-cooked ingredient material for the spring rolls was put on each of the dough sheets of the spring rolls and rolled. The resulting rolls were preserved in frozen state for 7 days at –20° C. and thawed. Each roll was fried with salad oil at 180° to 190° C. and freed of oil. After cooling for several minutes, each roll was placed in a tray of expanded polystyrene and covered with a wrap.

Each spring roll thus wrapped was allowed to cool at room temperature and each dough sheet was tested at an interval of one hour until five hours had elapsed. The spring rolls were eaten by ten panellers as time elapsed and the crispy mouth feel touch of each dough sheet was evaluated in accordance with the following standards by marks of from −1 to +1. The mean marks given by the ten panellers are shown in Table 1.

−1: no crispy mouth feel touch; 0: slight crispy mouth feel touch; +1: sufficient crispy mouth feel touch.

EXAMPLES 8 AND 9

The spring rolls were prepared and tested by panel test for mouth feel touch in the same way as in Examples 1 to 7 except that the food materials having the compositions shown in Table 1 were used and sifted on the dough sheets of the spring rolls by a sieve. The results are shown in Table 1.

TABLE 1

|  | Composition of food material (wt %) | After zero hour | After 1 hour | After 2 hours | After 3 hours | After 4 hours | After 5 hours |
|---|---|---|---|---|---|---|---|
| Example 1 | Rape seed oil (80), Rice powders (20) | 1.0 | 0.9 | 0.9 | 0.8 | 0.7 | 0.7 |
| Example 2 | Beef tallow (90), Potato starch (10) | 1.0 | 0.9 | 0.8 | 0.8 | 0.8 | 0.7 |
| Example 3 | Rape seed oil (89), Rice powders (10) Sorbitan fatty acid ester (1) | 1.0 | 1.0 | 1.0 | 0.9 | 0.9 | 0.8 |
| Example 4 | Lard (83.5), Potato starch (15) Saccharose fatty acid ester (1.5) | 1.0 | 1.0 | 1.0 | 0.9 | 0.8 | 0.8 |
| Example 5 | Potato starch (100) | 1.0 | 1.0 | 1.0 | 0.9 | 0.8 | 0.8 |
| Example 6 | Rape seed oil (80), Rice powders (10) Potato starch (10) | 1.0 | 1.0 | 1.0 | 0.9 | 0.8 | 0.8 |
| Example 7 | Sardine oil (77.5), Rice powders (7.5) Potato starch (15) | 1.0 | 1.0 | 1.0 | 0.8 | 0.8 | 0.8 |
| Example 8 | Cellulose (100) | 1.0 | 1.0 | 1.0 | 0.8 | 0.8 | 0.8 |
| Example 9 | Rice powders (50), Potato starch (50) | 1.0 | 1.0 | 1.0 | 0.9 | 0.8 | 0.8 |
| Comparative Example 1 | Soybean oil (100) | 1.0 | 0.2 | −1.0 | −1.0 | −1.0 | −1.0 |
| Comparative Example 2 | Sardine oil (100) | 1.0 | −0.1 | −1.0 | 1.0 | −1.0 | −1.0 |
| Comparative Example 3 | Soybean oil (99) Saccharide fatty acid ester (1) | 1.0 | −0.2 | −0.4 | −1.0 | −1.0 | −1.0 |
| Comparative Example 4 | Sardine oil (99) Sorbitan fatty acid ester (1) | 1.0 | 0.3 | −0.5 | −1.0 | −1.0 | −1.0 |

EXAMPLE 10

The spring rolls were prepared in the same way as in Examples 1 to 7 except using eight different kinds of the dough sheets of the spring rolls in which the attached areas of the food material of the Example 1 to the dough sheets of the spring rolls were increased by steps of 5% from 40% up to 75%. The spring rolls were wrapped and allowed to stand for five hours at room temperature and tested as to the mouth feel touch in the same way as in Example 1 to 7. The results of the mean marks given by ten panelists are plotted in a graph of the sole figure.

It is seen from this figure that the favorable effect of the present invention becomes manifest beginning from 40% or higher of the attached area of the food material to the dough sheet, and that as from 60% of the attached area, the mouth feel touch substantially unchanged from the crispy mouth feel touch directly after the frying is obtained even after lapse of five hours.

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. In a method for preparing a spring roll comprising the steps of placing an ingredient material on a dough sheet of the spring roll, rolling up the dough sheet to wrap said ingredient material, and frying the rolled spring roll, the improvement comprising:

applying a food material consisting essentially of a main component selected from the group consisting of polysaccharides, powders of grains and mixtures thereof to 40% or more of the total surface area of the dough sheet of the spring roll before frying said spring roll.

2. The method as in claim 1 wherein said food material is applied to not more than 90% of the total surface area of the dough sheet.

3. The method as in claim 1 wherein said polysaccharides are selected from the group consisting of potato starch, sweet potato starch, corn starch, wheat starch, tapioca starch, pregelatinized starch, acetic modified starch, phosphoric modified starch, heat-moisture treated starch, and mixtures thereof.

4. The method as in claim 1 wherein said powders of grains are selected from the group consisting of wheat powders, rice powders, semolina powders, corn grits, foxtail millet, Deccan grass, and mixtures thereof.

5. The method as in claim 1 wherein said powders of grains each have a grain size of 10 to 1000μ.

6. In a method for preparing a spring roll comprising the steps of placing an ingredient material on a dough sheet of the spring roll, rolling up the dough sheet to wrap said ingredient material, and frying the rolled spring roll, the improvement comprising:

applying a food material consisting essentially of oil and fats and a main component selected from the group consisting of polysaccharides, powders of grains and mixtures thereof to 40% or more of the total surface area of said dough sheet of the spring roll before frying said spring roll.

7. The method as in claim 6 wherein said oil and fats are selected from the group consisting of safflower oil, sun flower oil, cottonseed oil, rapeseed oil, soybean oil, rice oil, sesame oil, corn oil, kapok oil, peanut oil, olive oil, coconut oil, palm oil, cacao butter, shea butter, whale oil, sardine oil, Menhaden oil, herring oil, shark liver oil, cod liver oil, pollack liver oil, beef tallow, lard, butter fat and mixtures thereof.

8. The method as in claim 6 wherein said oil and fats are contained in an amount of 50 to 95 wt % based on the total weight of the food material.

9. In a method for preparing a spring roll comprising the steps of placing an ingredient material on a dough sheet of the spring roll, rolling up the dough sheet to wrap said ingredient material, and frying the rolled spring roll, the improvement comprising:

applying a food material consisting essentially of oil an fats, an emulsifier, and a main component selected from the group consisting of polysaccharides, powders of grains and mixtures thereof, to 40% or more of the total surface area of said dough sheet of the spring roll before frying said spring roll.

10. The method as in claim 9 wherein said emulsifier is selected from the group consisting of alginic acid propylene glycol ester, glycerin fatty acid ester, saccharose fatty acid ester, sorbitan fatty acid ester, propylene glycol fatty acid ester and mixtures thereof.

11. The method as in claim 9 wherein said emulsifier is contained in an amount of 0.1 to 10 parts by weight to 100 parts by weight of the oil and fats.

12. In a method for preparing a spring roll comprising the steps of placing an ingredient material on a dough sheet of the spring roll, rolling up the dough sheet to wrap said ingredient material, and frying the rolled food material, the improvement comprising:

applying a food material consisting essentially of a main component selected from the group consisting of polysaccharides, powders of grains and mixtures thereof, and a viscosity increasing agent to 40% or more of the total surface area of dough sheet of the spring roll before frying said spring roll.

13. The method as in claim 12 wherein said viscosity increasing agent is selected from the group consisting of sodium alginate, carboxyl methyl cellulose calcium, carboxyl methyl cellulose sodium, starch sodium glycolate, starch sodium phosphate, sodium polyacrylate, methyl cellulose and mixtures thereof.

14. The method as in claim 12 wherein the viscosity increasing agent is contained in an amount of 10 wt % or less based on a total weight of the food material.

15. The method as in claim 1 wherein said food material is in solid form and is applied in an amount of 1.0 to 10.0 g/100 cm$^2$ of the total surface area of the dough sheet.

16. The method as in claim 1 wherein said food material is in liquid form and is applied in an amount of 1.0 to 5.0 g/100 cm$^2$ of the total surface area of the dough sheet.

17. The method as in claim 6 wherein said food material is applied to not more than 90% of the total surface area of the dough sheet.

18. The method as in claim 9 wherein said food material is applied to not more than 90% of the total surface area of the dough sheet.

19. The method as in claim 12 wherein said food material is applied to not more than 90% of the total surface area of the dough sheet.

20. The method as in claim 6 wherein said polysaccharides are selected from the group consisting of potato starch, sweet potato starch, corn starch, wheat starch, tapioca starch, pregelatinized starch, acetic modified starch, phosphoric modified starch, heat-moisture treated starch, and mixtures thereof.

21. The method as in claim 9 wherein said polysaccharides are selected from the group consisting of potato starch, sweet potato starch, corn starch, wheat starch, tapioca starch, pregelatinized starch, acetic modified starch, phosphoric modified starch, heat-moisture treated starch, and mixtures thereof.

22. The method as in claim 12 wherein said polysaccharides are selected from the group consisting of potato starch, sweet potato starch, corn starch, wheat starch, tapioca starch, pregelatinized starch, acetic modified starch, phosphoric modified starch, heat-moisture treated starch, and mixtures thereof.

23. The method as in claim 6 wherein said powders of grains are selected from the group consisting of wheat powders, rice powders, semolina powders, corn grits, foxtail millet, Deccan grass, and mixtures thereof.

24. The method as in claim 9 wherein said powders of grains are selected from the group consisting of wheat powders, rice powders, semolina powders, corn grits, foxtail millet, Deccan grass, and mixtures thereof.

25. The method as in claim 12 wherein said powders of grains are selected from the group consisting of wheat powders, rice powders, semolina powders, corn grits, foxtail millet, Deccan grass, and mixtures thereof.

26. The method as in claim 6 wherein said powders of grains each have a grain size of 10 to 1000μ.

27. The method as in claim 9 wherein said powders of grains each have a grain size of 10 to 1000μ.

28. The method as in claim 12 wherein said powders of grains each have a grain size of 10 to 1000μ.

29. The method as in claim 6 wherein said food material is in solid form and is applied in an amount of 1.0 to 10.0 g/100 cm$^2$ of the total surface area of the dough sheet.

30. The method as in claim 9 wherein said food material ms in solid form and is applied in an amount of 1.0 to 10.0 g/100 cm$^2$ of the total surface area of the dough sheet.

31. The method as in claim 12 wherein said food material is in solid form and is applied in an amount of 1.0 to 10.0 g/100 cm$^2$ of the total surface area of the dough sheet.

32. The method as in claim 6 wherein said food material is in liquid form and is applied in an amount of 1.0 to 5.0 g/100 cm$^2$ of the total surface area of the dough sheet.

33. The method as in claim 7 wherein said food material is in liquid form and is applied in an amount of 1.0 to 5.0 g/100 cm$^2$ of the total surface area of the dough sheet.

34. The method as in claim 12 wherein said food material is in liquid form and is applied in an amount of 1.0 to 5.0 g/100 cm$^2$ of the total surface area of the dough sheet.

* * * * *